US005253672A

United States Patent [19]

Uehara et al.

[11] Patent Number: 5,253,672

[45] Date of Patent: Oct. 19, 1993

[54] HYDRAULIC PRESSURE CONTROL SYSTEM

[75] Inventors: Kazuo Uehara, Tokyo; Tadao Karakama, Kawasaki; Sadao Nunotani, Hiratsuka; Naoki Ishizaki, Kamakura; Masayuki Tanaami, Kawasaki, all of Japan

[73] Assignee: Kabushiki Kaisha Komatsu Seisakusho, Tokyo, Japan

[21] Appl. No.: 336,570

[22] Filed: Apr. 11, 1989

Related U.S. Application Data

[63] Continuation of Ser. No. 8,386, Jan. 28, 1987, abandoned.

[30] Foreign Application Priority Data

Jan. 30, 1986 [JP] Japan ................ 61-16934
Jun. 12, 1986 [JP] Japan ................ 61-135011
Sep. 30, 1986 [JP] Japan ................ 61-230029

[51] Int. Cl.[5] ................ F15B 13/042; F16K 31/383; G05D 7/01

[52] U.S. Cl. ................ 137/489; 251/35

[58] Field of Search ................ 137/596.14, 596.15, 137/486, 489; 251/33, 35, 37, 36

[56] References Cited

U.S. PATENT DOCUMENTS 570,727 11/1896 Gale ................ 251/35
1,046,236 12/1912 Wagner ................ 251/44
2,635,634 4/1953 Thurber, Jr. ................ 251/35
2,673,706 3/1954 Matteson ................ 251/35
2,694,544 11/1954 Hall ................ 251/35
2,926,882 3/1960 Russell ................ 251/35
3,076,471 2/1963 Salerno ................ 251/35
3,269,416 8/1966 Adams .
3,315,694 4/1967 Addison, Jr. ................ 251/35
3,411,536 11/1968 Tennis ................ 137/596.15
3,841,345 10/1974 Cryder ................ 137/596.15
3,906,991 9/1975 Haussler ................ 251/35
4,307,654 12/1981 de Almeida ................ 251/63.4
4,345,736 8/1982 Zeuner et al. ................ 137/596.15
4,493,473 1/1985 Rexer ................ 251/37
4,535,809 8/1985 Andersson ................ 137/625.6
4,593,715 6/1986 Stich et al. ................ 251/35
4,630,639 12/1986 Akita et al. ................ 137/486

FOREIGN PATENT DOCUMENTS 0079870 5/1983 European Pat. Off. .
0095782 12/1983 European Pat. Off. .
60-172709 9/1985 Japan .
460402 4/1975 U.S.S.R. ................ 251/35
1314389 4/1973 United Kingdom .

*Primary Examiner*—George L. Walton
*Attorney, Agent, or Firm*—Graham & James

[57] ABSTRACT

A pressure control system in which a pressure in a back pressure chamber of a flow control valve is controlled according to a throttle opening of a pilot valve to locate stationary the valve body of the flow control valve at a position corresponding to the throttle opening of the pilot valve. In the system, a fixed throttle is provided in an oil passage extended to the back pressure chamber of the flow control valve, thereby applying a dampering action to the valve body.

7 Claims, 9 Drawing Sheets

HYDRAULIC PRESSURE CONTROL SYSTEM

This is a continuation of copending application Ser. No. 07/008,386 filed on Jan. 28, 1987 now abandoned.

BACKGROUND OF THE INVENTION

The present invention relates to hydraulic or oil pressure control systems which are used in oil circuits for driving actuators built in machines designed for construction work and, more specifically, to an oil pressure control system in which a flow control valve is provided in an oil input circuit of an actuator to control the flow control valve under the control of a pilot valve.

A prior art oil pressure control system of the type referred to is disclosed in U.S. Pat. No. 4,535,809 in which, as shown in FIG. 1, flow control valves 'g' are provided in oil input circuits 'c1' and 'c2' connecting an oil pressure pump 'a' and an actuator 'b' and also in oil output circuits 'e1' and 'e2' connecting the actuator 'b' and a tank 'd' to control the inflow rate of the actuator 'b' according to the opening of the respective pilot valves 'f'.

FIG. 2 shows a particular arrangement of the pilot valve 'f' and the flow control valve 'g'. More specifically, input and output ports 'h' and 'i' of the flow control valve 'g' are opened and closed by a poppet 'j'. The poppet 'j' is provided with a throttling slit 'l' to controllably throttle oil under pressure flowing into the input port 'h' and send it through the slit to a back pressure chamber 'k'. The pilot valve 'f' is inserted in a pilot circuit 'm' connected between the back pressure chamber 'k' and the output port 'i'.

In the operation of foregoing prior art example, when the pilot valve 'f' is throttled to be opened by a predetermined amount while the input port 'h' receives oil under pressure, pilot oil flows through the pilot circuit 'm' at a flow rate corresponding to the opening of the pilot valve 'f'. This pilot oil causes the development of a pressure difference between the input port 'h' and the back pressure chamber 'k', whereby the poppet 'j' is opened by an amount corresponding to the pressure difference so that a predetermined amount of pressurized oil flows from the input port 'h' to the output port 'i'. The gradual opening of the poppet 'j' causes the opened amount of the throttling slit 'l' to be correspondingly increased to gradually increase the rate of the pilot oil flowing from the input port 'h' to the back pressure chamber 'k' and gradually decrease the pressure difference between the input port 'h' and the back pressure chamber 'k'. The movement of the poppet 'j' is stopped as soon as the pressure difference reaches zero. In this way, the flow rate of oil under pressure flowing from the input port 'h' to the output port 'i' is controlled not by the pressure of the input port 'h' but by the opening of the pilot valve 'f'.

Shown in FIG. 3 is another prior art oil pressure control system in which a flow control valve 'g' has a fixed orifice 'l1' provided between a poppet 'j' and an input port 'h' to develop a pressure difference therebetween as well as a variable throttle 'l2' provided between a back pressure chamber 'k' and another output port of the valve 'g' leading to the pilot valve 'f' to decrease the opening of the valve 'g' as the poppet 'j' moves upwards. In this control system, when the pilot valve 'f' is operated to increase the throttle opening area, a pressure Pp at the entrance side of the pilot valve 'f' is reduced and a pressure $P_B$ in the back pressure chamber 'k' of the flow control valve 'g' is lowered. This cause a pressure difference to be developed between both ends of the fixed orifice 'l1' of the poppet 'j' so that this pressure difference causes upward movement of the poppet 'j', which results in that the input port 'h' communicates with the output port. As the poppet 'j' moves upwards, the opening area of the variable throttle is gradually reduced and correspondingly the pressure of the back pressure chamber 'k' is increased until the poppet 'j' stops. In other words, in the oil pressure control system, the poppet 'j' is located at a desired position by decreasing an equivalent throttle opening area corresponding to a sum of the throttle opening area of the variable throttle 'l2' and the throttle opening area of the pilot valve 'f' to increase the pressure $P_B$.

There is shown in FIG. 4, an oil pressure control system as yet another prior art, wherein, in a flow control valve 'g', a metering pin 'r' is inserted into an axially-extended bore made in a poppet 'j' so that the metering pin 'r' and a slit provided in the poppet 'j' form a variable throttle S between an input port 'h' and a back pressure chamber 'k'. In the operation of this oil pressure control system, when the pilot valve 'f' is actuated to lower the pressure of the back pressure chamber 'k', a pressure difference takes place between upper and lower pressure acting surfaces of the poppet 'j' to move up the poppet 'j' and communicate the input port 'h' with the output port 'i'. As the poppet is moved up, the opening of the variable throttle S increases and the pilot oil rate flowing from the input port 'h' to the back pressure chamber 'k' increases, whereby a pressure difference between the input port 'h' and back pressure chamber 'k' is gradually reduced to zero, at which time the movement of the poppet 'j' is stopped.

In the foregoing prior-art pressure control systems, when the pilot valve 'f' is operated to provide such a pilot flow as shown by a dotted line in FIG. 5, as explained above, a pressure difference between the input port 'h' and back pressure chamber 'k' of the flow control valve 'g' causes the poppet 'j' to be opened so that oil under pressure flows from the input port 'h' to the output port 'i', thus increasing the pressure of the output port 'i'. The increased pressure of the output port 'i' is applied to the pressure receiving surface of the poppet 'j' provided on the side of the output port 'i'. For this reason, an increase in the pressure of the output port 'i' causes the poppet 'j' to be momentarily opened to an extent larger than a predetermined amount. Therefore, the prior art systems have had such a problem that a curve indicative of the main flow rate flowing through the flow control valve 'g' has a projected part in its initial stage as shown by a solid line in FIG. 5, which means that the initial stage operation of the flow control valve 'g' causes momentary, abrupt operation of the actuator associated with the valve.

SUMMARY OF THE INVENTION

A primary object of the present invention is, therefore, to provide an oil pressure control system in which a flow control valve is controlled according to the throttle opening of a pilot valve, and even abrupt opening of the pilot valve enables avoidance of generation of an over-shooting phenomenon and therefore prevention of momentary, abrupt operation of an actuator operatively associated with the flow control valve.

According to an oil pressure control system of the present invention, a fixed or stationary throttle is provided in a pressurized oil passage leading to a back pressure chamber in a flow control valve and the back pressure chamber is used as a dampering chamber.

Accordingly, even when the pilot valve is abruptly opened to cause pressurized oil for driving a valve body to abruptly flow out of or into the back pressure chamber, the stationary throttle acts as a resistance to such abrupt outflow or inflow, that is, acts to prevent an abrupt change in the pressure of the back pressure chamber, whereby the valve body can be smoothly shifted.

DETAILED DESCRIPTION OF THE PREFERRED EMBODIMENTS

Figure 6:
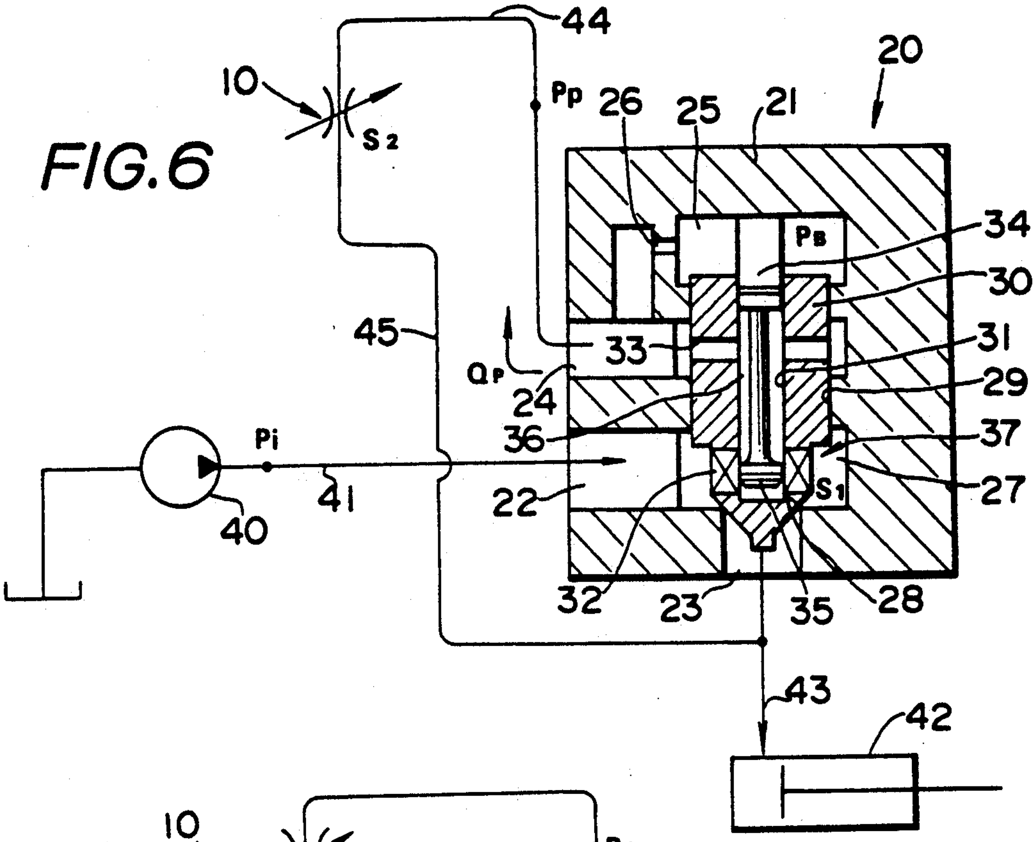
FIG. 6 schematically illustrates an oil pressure control system according to an embodiment of the present invention which comprises a flow control valve shown in a cross-sectional form.

Referring first to FIG. 6, there is shown an oil pressure control system in accordance with the present invention, in which reference numeral 10 is a pilot valve comprising a pilot variable throttle or a variable throttling mechanism and reference numeral 20 is a flow control valve controlled by the pilot valve 10. The flow control valve 20 includes a casing 21 which is provided with an input port 22, an output port 23 and a pilot output port 24 and a back pressure chamber 25, the pilot output port 24 communicating with the back pressure chamber 25 through a fixed or stationary orifice 26. A chamber 27 is provided between the input and output ports 22 and 23, and a valve seat 28 is provided on an opening edge of the input port 22 on the side of the chamber 27. Also provided in the casing 21 is a valve body receiving bore 29 which is extended from the chamber 27 to the back pressure chamber 25 with a poppet 30 being inserted into the bore 29. The poppet 30 is provided therein with a spool hole 31. The poppet 30 is also provided with a slit 32 through which the input port 22 is fluidically coupled to the spool hole 31 and with a through-hole 33 through which the output port 24 is fluidically coupled to the spool hole 31, respectively. Inserted into the spool hole 31 is a spool 34 which is fixedly mounted at its one end onto an end face of the back pressure chamber 25. The spool 34 is also formed to have a smaller-diametered intermediate part, a passage 36 being defined by the intermediate part and the wall of the spool hole 31. The spool 34 is also provided at the other end with a land part 35 which forms a variable throttle 37 together with the slit 32.

The flow control valve 20 is coupled at its input port 22 to an outlet side of a pump 40 through a pipe line 41, and at its output port 23 to an actuator 42 through a pipe line 43. The flow control valve 20 is also coupled at its output port 24 to an inlet side of the pilot valve 10 through a pipe line 44, the valve 10 being coupled at its outlet side to the pipe line 43 of the actuator 42 through a pipe line 45.

The operation of the control system of the invention will be explained. Hydraulic oil discharged out of the pump 40 enters the flow control valve 20 at the input port 22, and then reaches the output port 24 by way of the slit 32 and the through-hole 33. The hydraulic oil arrived at the output port 24 is partly sent through the pipe line 44 to the pilot valve 10 and partly sent through the stationary throttle 26 to the back pressure chamber 25. In this pressure control system, when the throttle opening of the pilot valve 10 is zero, a pressure Pi at the input port 22 of the flow control valve 20 is equal to a pressure Pp at the output port 24, that is, the pressure Pi of the input port 22 is equal to a pressure $P_B$ in the back pressure chamber 25, so that the poppet 30 is located stationary at such a position as shown in FIG. 6. As a result, hydraulic oil will not be sent to the actuator 42.

When the pilot valve 10 is opened, the pressure Pp of the output port 24 drops and correspondinly the pressure of $P_B$ of the back pressure chamber 25 also drops. This causes a pressure difference to take place between the pressure $P_B$ in the back pressure chamber 25 and the pressure Pi in the chamber 27, thus starting to shift upwards the poppet 30. As the poppet 30 moves upwards, an opening area $S_l$ of the variable throttle 37 increases, whereby the amount of hydraulic oil flowing from the input port 22 to the output port 24 is correspondingly increased. This causes the pressure Pp of the output port 24 to be gradually increased to correspondingly increase the pressure $P_B$ of the back pressure chamber 25, which results in that a pressure difference between the pressure $P_B$ of the chamber 25 and the pressure Pi of the input port 22 becomes small, whereby the poppet 30 is stopped at a predetermined position.

During movement of the poppet 30, the hydraulic oil of the back pressure chamber 25 is discharged therefrom through the stationary throttle 26 to the output port 24, in which case the stationary throttle 26 acts as a resistance so that the poppet 30 is subjected to a force in a direction of reducing the movement speed of the poppet 30, that is, the poppet 30 is subjected to a so-called dampering action. Under influence of this action, the poppet 30 can be smoothly shifted to a predetermined position without any abrupt shift.

Figure 7:
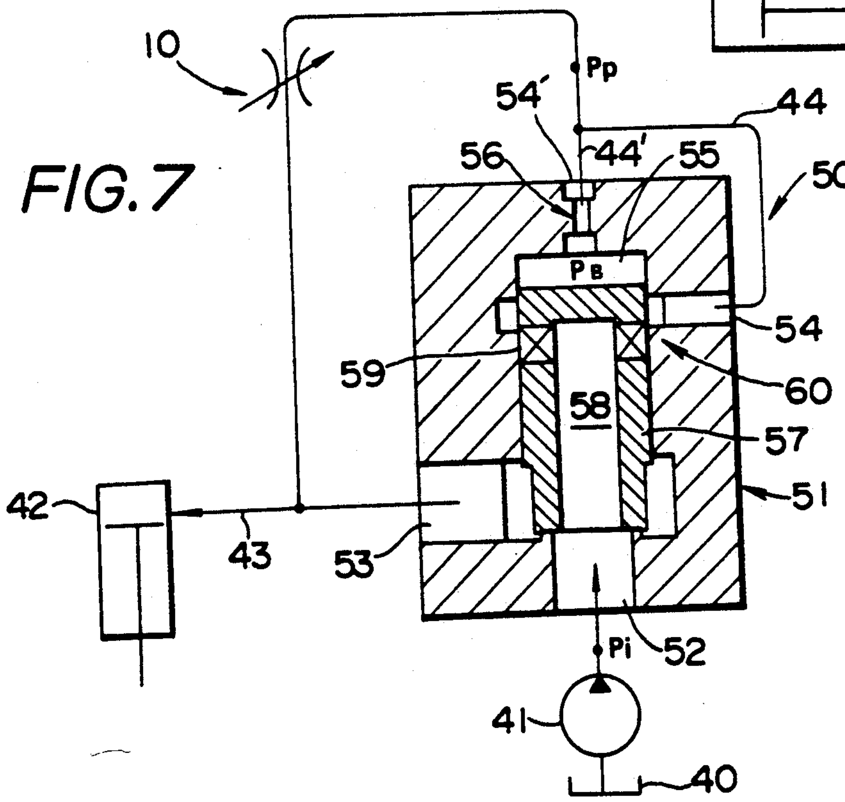
FIG. 7 schematically illustrates an oil pressure control system according to another embodiment of the present invention which comprises another flow control valve shown in a cross-sectional form.

Shown in FIG. 7 is another embodiment of the present invention which comprises a flow control valve 50 having a casing 51. The casing 51 is provided therein with an input port 52, output ports 53 and 54 and with a third output port 54'. The port 54' has a stationary throttle 56 through which the port 54' is fluidically coupled to a back pressure chamber 55. A poppet 57 is provided in its center with a recess 58 which is opened to the input port 52, and in its upper part with a slit 59 which communicates the recess 58 with an outer peripheral surface of the poppet 57 to form a variable throttle 60 with the output port 54. Like the flow control valve 20 in FIG. 6, such a flow control valve 50 arranged as mentioned above is coupled at its input port 52 to a pump 40 through a pipe line 41, at its output port 53 to an actuator 42 through a pipe line 43, at its output port 54 to the pipe line 43 through a pipe line 44 and a pilot valve 10, and at its output port 54' to the pipe line 44 through a pipe line 44', respectively. Accordingly, hydraulic oil from the pump is sent to the pilot valve 10 through the input port 52, recess 58, variable throttle 60 and output port 54 of the flow control valve 50 and through the wiring pipe 44. Part of the oil flowing through the pipe line 44 to the pilot valve 10 is supplied through the pipe line 44' to the back pressure chamber 55.

In the operation of the pressure control system, when the throttle opening of the pilot valve 10 is zero, a pressure Pi in the input port 52 of the flow control valve 50 is equal to a pressure $P_B$ of the back pressure chamber 55, which results in that the poppet 57 is located stationary at such a position as shown in FIG. 7 and therefore hydraulic oil is not supplied to the actuator 42. As the throttle of the pilot valve 10 is opened, a pressure Pp in the output port 54' drops and the pressure $P_B$ in the back pressure chamber 55 correspondingly drops. This causes a difference between the pressure $P_B$ of the back pressure chamber 55 and the pressure Pi of the recess 58 to occur with the result that the poppet 57 starts to shift upwards. Upward shift of the poppet 57 causes the opening area of the variable throttle 60 to be gradually increased so that the pressure of the back pressure chamber $P_B$ is also gradually increased until the poppet 57 stops. Thereupon, hydraulic oil in the back pressure chamber 55 flows in and out through the stationary throttle 56, during which the stationary throttle 56 functions as a resistance, that is, the poppet 57 is subjected to a force in a direction of reducing the speed of the poppet. i.e., to a so-called dampering action. This action enables smooth shift of the poppet 57 to a predetermined position without any abrupt shift.

Figure 1:
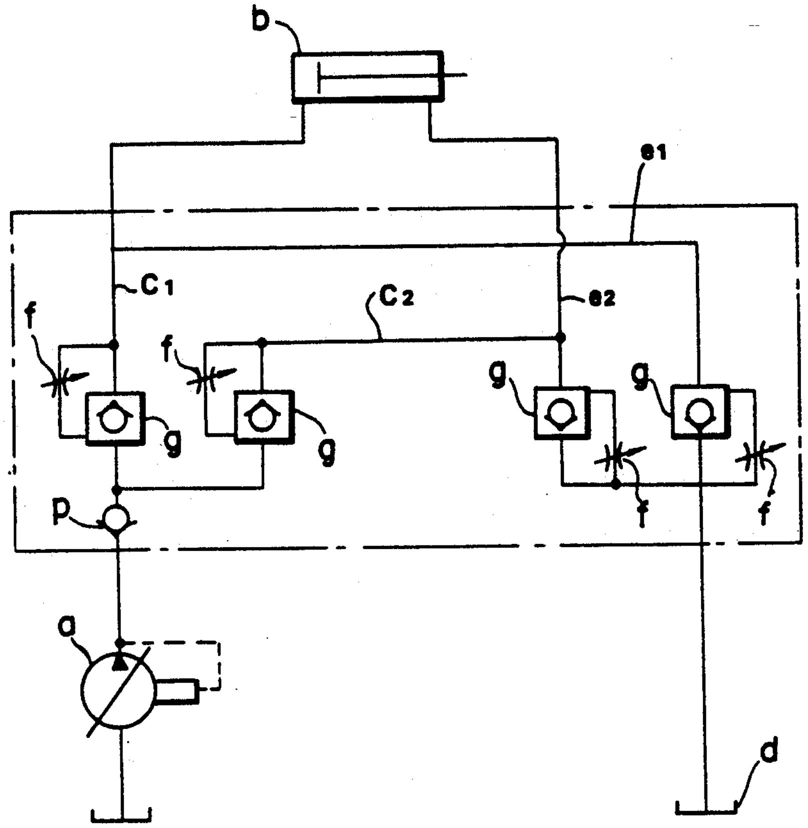
FIG. 1 (PRIOR ART)
FIG. 1 shows an oil pressure control circuit which uses prior art oil pressure control systems.
Figure 5:
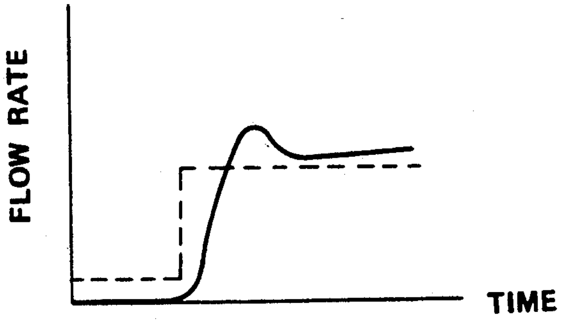
FIG. 5 (PRIOR ART)
FIG. 5 is a graph showing a pressure change in an actuator in response to operation of a poppet valve in the prior art system.
Figure 2:
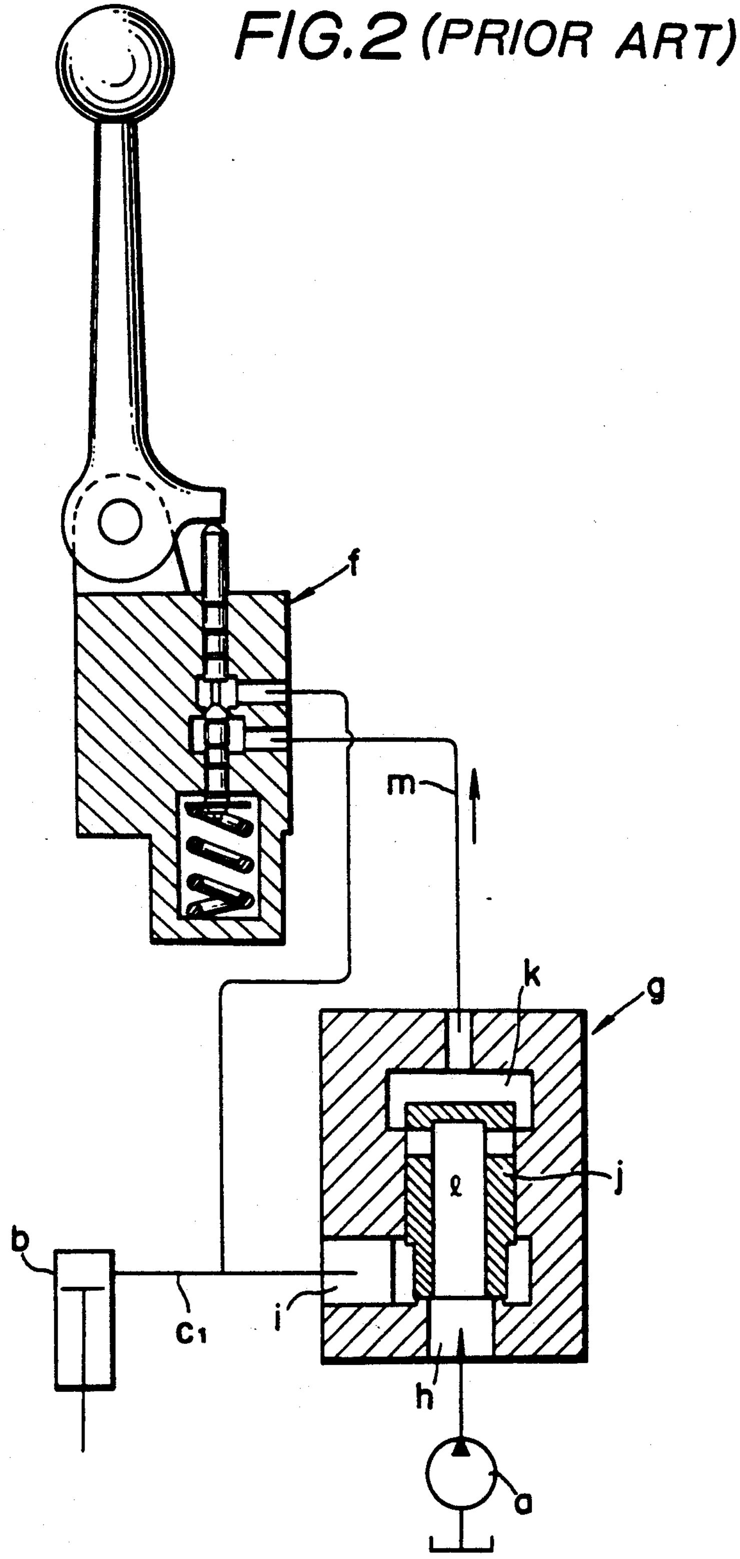
FIG.2 (PRIOR ART)
FIG. 2 schematically illustrates the prior art pressure control system which comprises pilot and flow control valves shown both in a cross sectional form.
Figure 3:
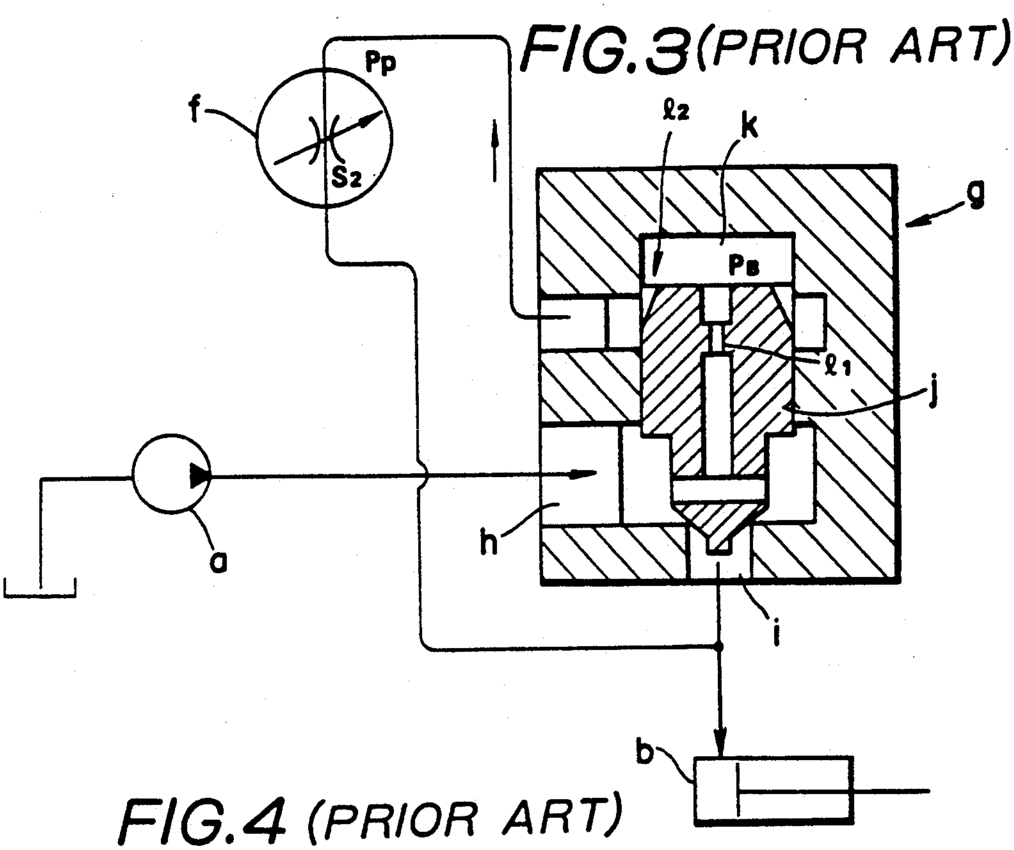
FIG.3 (PRIOR ART)
FIG. 3 schematically illustrates another form of the prior art pressure control system which comprises another form of the flow control valve shown in a cross-sectional form.
Figure 4:
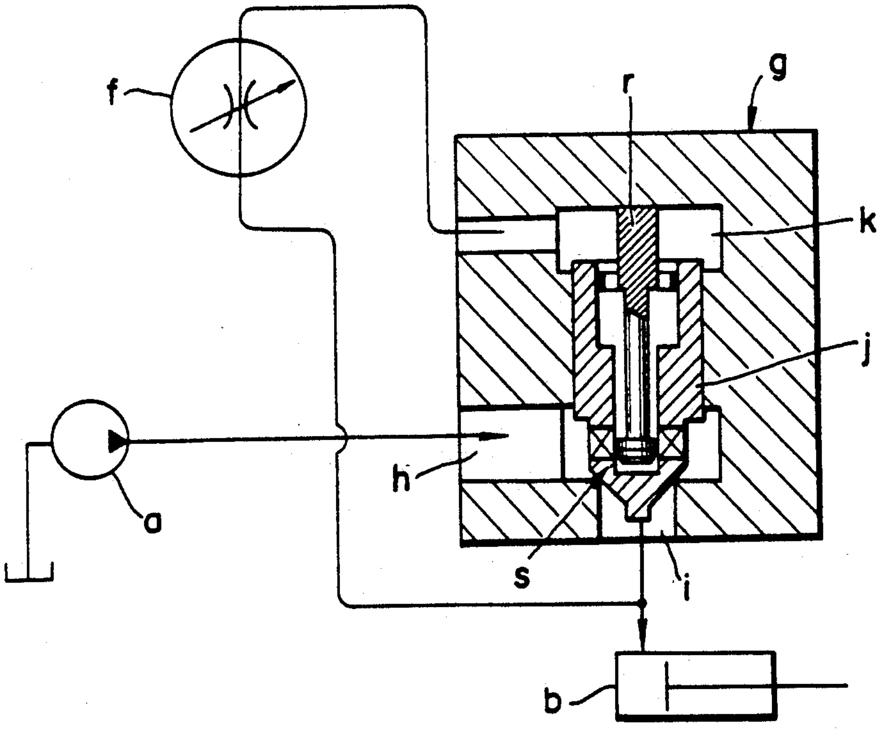
FIG.4 (PRIOR ART)
FIG. 4 schematically illustrates yet another form of the prior art pressure control valve system which comprises yet another form of the flow control valve shown in a cross-sectional form.
Figure 8:
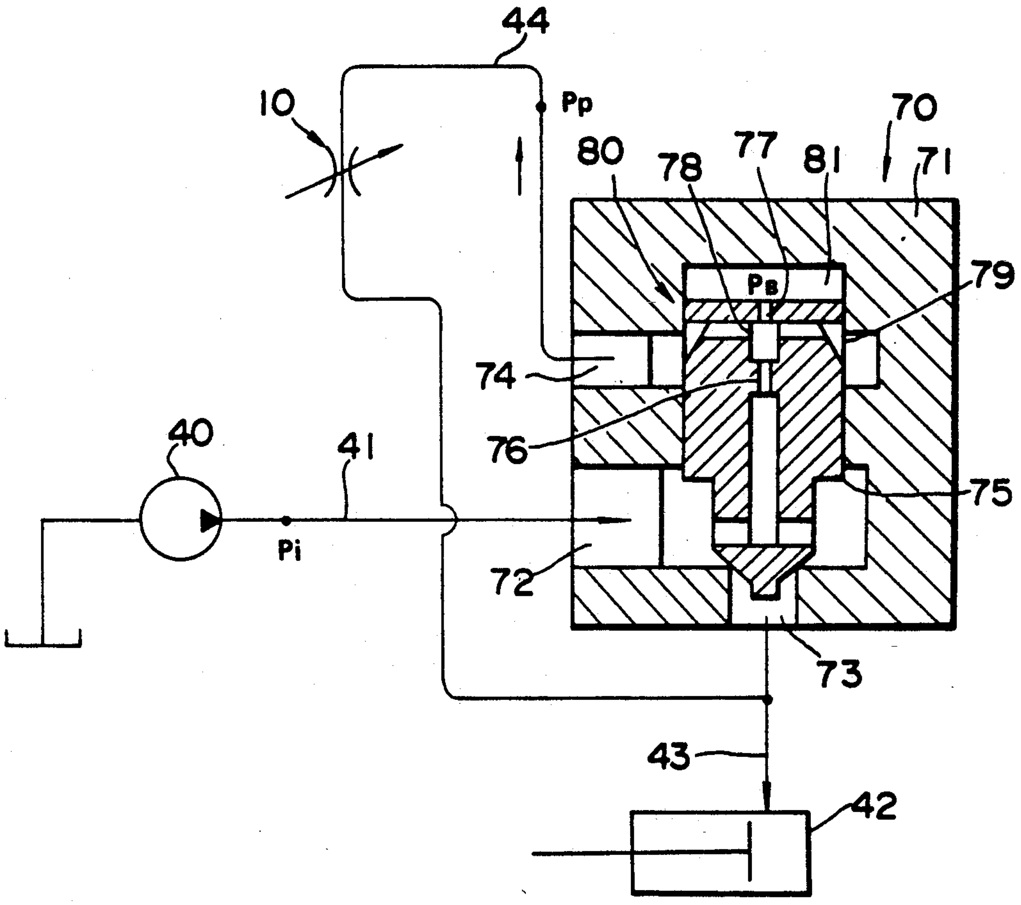
FIG. 8 schematically illustrates an oil pressure control system according to yet another embodiment of the present invention which comprises yet another flow control valve shown in a cross-sectional form.

Referring to FIG. 8, there is shown yet another embodiment of the present invention in which a casing 71 of a flow control valve 70 has input and output ports 72, 73 and 74 similar to those in FIG. 4. A poppet 75 is provided with first and second stationary throttles 76 and 77 which are fluidically coupled to each other by a passage 78. The poppet 75 is also provided with a slant ring-shaped groove 79 which leads to the passage 78 to form a variable throttle 80 with the output port 74. The variable throttle 80 communicates with a back pressure chamber 81 through the second stationary throttle 77. Like the flow control valve 20 in FIG. 6, the flow control valve 70 is coupled at its input port 72 to a pump 40 through a pipe line 41, at its output port 73 to an actuator 42 through a pipe line 43, and at its output port 74 to the pipe line 43 through a pipe line 44 and a pilot valve 10, respectively. Accordingly, hydraulic oil from the pump 40 is supplied partly to the pilot valve 10 through the first stationary throttle 76, variable throttle 80, output port 74 and wiring pipe 44, and also supplied partly to the back pressure chamber 81 through the second stationary throttle 77. So long as the throttle opening of the pilot valve 10 is zero, a pressure Pi in the input port 72 is equal to a pressure $P_B$ in the back pressure chamber 81, thus resulting in the poppet 75 located at such a position as shown in FIG. 8. As a result, hydraulic oil is not supplied to the actuator 42. As the throttle of the pilot valve 10 is opened, a pressure Pp in the output port 74 drops and the pressure $P_B$ in the back pressure chamber 81 drops correspondingly, so that a difference takes place between the pressure $P_B$ of the chamber 81 and the pressure Pi of the input port 72, which starts to shift upwards the poppet 75. As the poppet 75 shifts upwards, the opening area of the variable throttle 80 is gradually decreased and correspondingly the pressure $P_B$ of the back pressure chamber 81 is gradually increased until the poppet 75 stops. During such shift of the poppet, hydraulic oil in the back pressure chamber 81 flows in and out through the second stationary throttle 77, upon which the secondary stationary throttle 77 serves as a resistance, that is, the poppet 75 is subjected to such a direction as reducing the speed of the poppet, i.e., to a so-called dampering action. This action enables the poppet 75 to be smoothly shifted to a predetermined position without being subjected to any abrupt shift.

Figure 9:
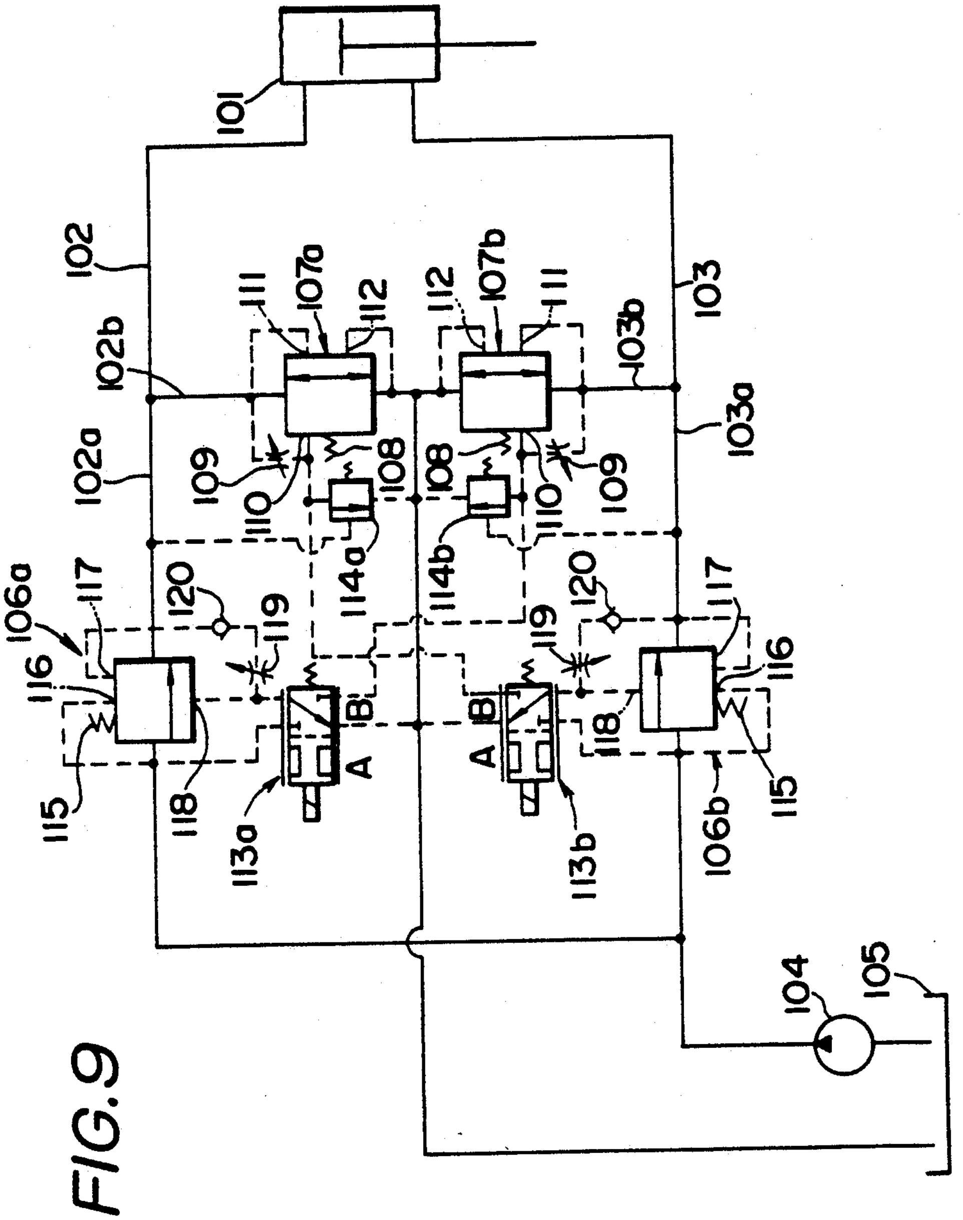
FIG. 9 shows an oil pressure control circuit which uses oil pressure control systems according to yet a further embodiment of the present invention to drive an actuator built in a machine designed for construction work.
Figure 10:
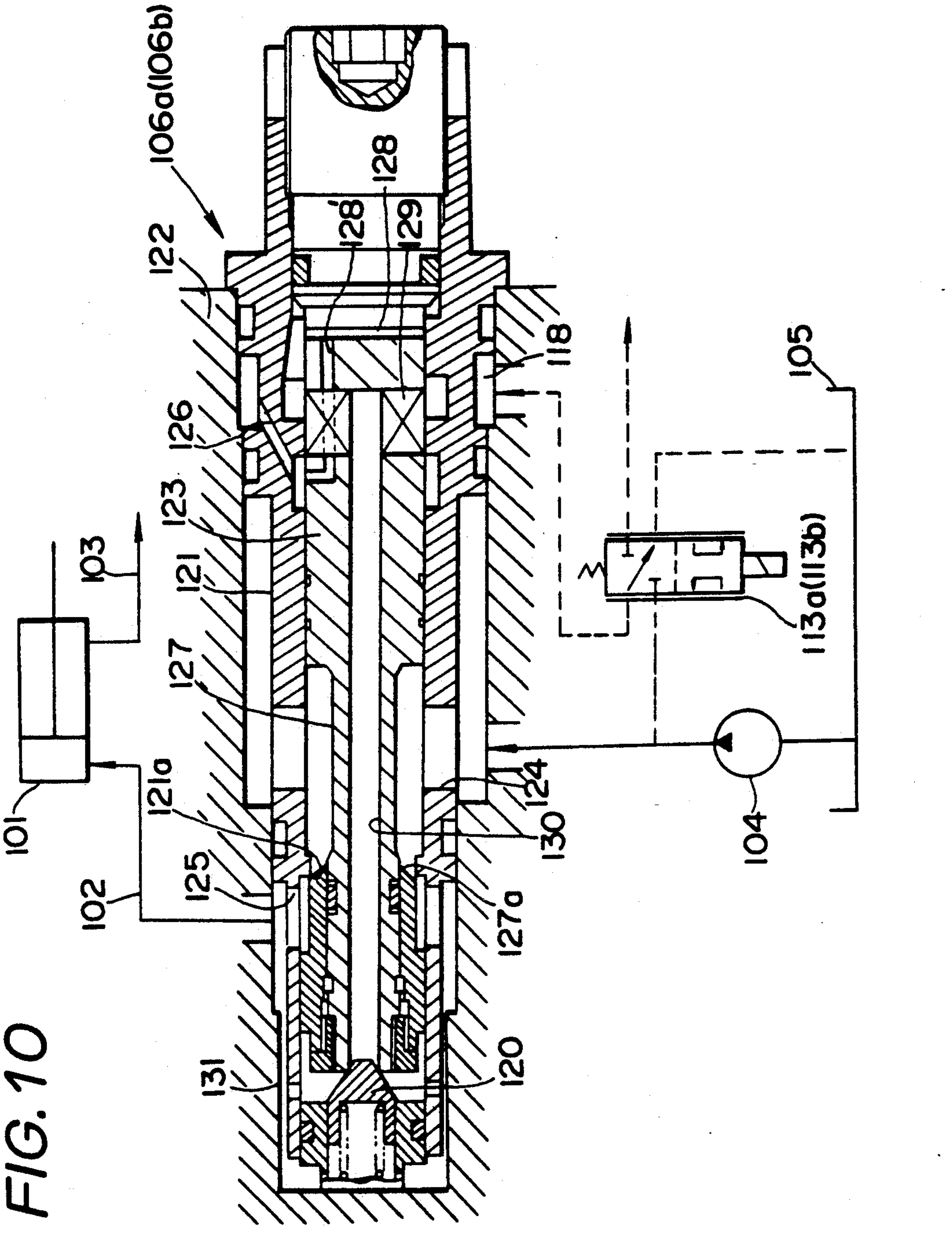
FIG. 10 shows a particular construction, in cross section, of one of flow control valves in one of the oil pressure control systems used in the oil pressure control circuit of FIG. 9.

FIGS. 9 and 10 show an oil pressure control circuit which comprises oil pressure control systems of the present invention to drive an actuator built in a machine designed for construction work. In the drawings, reference numeral 101 is a reciprocating actuator, 102 and 103 first and second supply/return paths or lines connected to both inlet and outlet of the actuator 101, 104 a hydraulic pump, 105 a tank. The first and second lines 102 and 103 are branched respectively into supply and drain lines **102*a*, 103*a* and 102*b*, 103*b*, the supply lines 102*a* and 103*a* being connected to the hydraulic pump 104 through flow control valves 106*a* and 106*b* provided on the meter-in side, the drain lines 102*b* and 103*b* being connected to the tank 105 through flow control valves 107*a* and 107*b*** provided on the meter-out side.

The flow control valves **107*a* and 107*b* on the meter-out side are valves of a two-way poppet type, and have each a spring 108 for energizing the valve in its closing direction, a pilot port 110 connected through a variable throttle valve 109 to its upstream line to close the upstream line, a pilot port 111 connected to the upstream line to open the upstream line, and a pilot port 112 connected to its downstream line to open the downstream line. The closing pilot ports 110 of the flow control valves 107*a* and 107*b* are coupled to the tank side respectively through first and second pilot valves 113*a* and 113*b* which will by explained later. The closing pilot ports 110 are connected to the tank side through relief valves 114*a* and 114*b* which are opened when the supply lines 102*a* and 103*a*** exceed their predetermined levels in pressure, respectively.

The flow control valves **106*a* and 106*b* on the meter-in side, like the flow control valves 107*a* and 107*b* on the meter-out side, are valves of a two-way poppet type, and have each, on its closing side, a spring 115 for energizing the valve in its closing direction, a pilot port 116 connected to its upstream line to close the upstream line, a pilot port 117 connected to its downstream line to close the downstream line, while, on its opening side, a pilot port 118 connected to the upstream line through the pilot valve 113*a* or 113*b* to open the upstream line, the opening pilot port 118 being connected to the downstream line through a variable throttle 119 and a check valve 120. The variable throttles 109 and 119 are arranged to be opened by closing the flow control valves 106*a*, 106*b*, 107*a* and 107*b***, respectively.

The first and second pilot valves **113*a* and 113*b* have each communication and neutral positions A and B to be switched to the communication position A when the associated solenoid is energized. The pilot valves 113*a* and 113*b* are arranged to throttle their fluid passing therethrough in response to their switching operation. First one 113*a* of the both pilot valves 113*a* and 113*b* is provided between the opening pilot port 118 of the first pilot valve 106 on the first meter-in side and its upstream line and between the closing pilot port 110 of the flow control valve 107*b* on the second meter-out side and the tank line. On the other hand, the second pilot valve 113*b* is provided between the opening pilot port 118 of the flow control valve 106*b* on the second meter-in side and its upstream line and between the closing pilot port 110 of the flow control valve 107*a* on the first meter-out side and the tank line. The both pilot valves 113*a* and 113*b* are arranged to communicate at their communication positions A with the respective pilot lines and at their neutral positions B to close the closing pilot ports 110 on the meter-out side and drain the opening pilot ports 118** on the meter-in side.

With the above-mentioned arrangement, when the pilot valves **113*a* and 113*b* are in the neutral position B, the flow control valves 106*a* and 106*b* on the both meter-in side are drained at their opening pilot ports 118 and 118 and receive the pump pressure at their pilot ports 116 for opening the upstream line, so that the flow control valves 106*a* and 106*b* on the both meter-in side are put in their closed state and the actuator 101** is not driven.

When one, for example, first one **113*a* of the both pilot valves 113*a* and 113*b* is switched to its communication position A, the first flow control valve 106*a* on the meter-in side is subjected at its opening pilot port 118 to a pressure to open the flow control valve 106*a*, whereby oil under pressure is supplied from the hydraulic pump 104 to one port of the actuator 101 to drive the actuator in one direction. Thereupon, since the flow control valve 107*b* on the second meter-out side is drained at its closing pilot port 110 through the first pilot valve 113*a* to the tank line, the return oil flow of the actuator 101 is drained through the flow control valve 107*b***.

In the above operation, if the flow control valve **106*a* on the first meter-in side is opened too much, then the associated variable throttle 119 is opened in response to such valve shift to reduce the pilot pressure at the associated opening pilot port 118, thus correcting such excessive opening of the valve 106*a*. Under this condition, the rate of oil flowing through the flow control valve 106*a* is independent of the pressure of oil discharged from the hydraulic pump 104 and determined by the pressure at the opening pilot port 118 and therefore by the opening of the pilot valve 113*a*. When a pressure in the downstream line on the meter-in side is higher than a pressure in the pump side line, the higher pressure acts on the downstream-closing pilot port 117 of the flow control valve 106*a* to close the valve 106*a***.

When the other **113*b* of the both pilot valves 113*a* and 113*b* is switched, the flow control valves 106*a* and 107*a* on the second meter-in side and on the first meter-out side are both operated to drive the actuator 101 in the opposite direction. The operation of the both valves 106*a* and 107*a*** is substantially the same as that of the above case.

There is shown a particular arrangement of the flow control valve **106*a* or 106*b* on the meter-in side in FIG. 10 in which reference numeral 121 is a sleeve fitted into a casing 122, into which sleeve 121 a poppet 123 is slidably inserted. The sleeve 121 has an inlet port 124 communicating with its upstream line, an outlet port 125 communicating with its downstream line, and a stationary throttle port 126 communicating with the opening pilot port 118. The poppet 123 is also provided in its middle with a constricted part 127 which is opposed to the inlet port 124 and also opposed at its one axial land portion to the outlet port 125. That is, the land portion of the constricted part 127 is formed as a valve seat 127*a* which abuts against a valve seat 121*a* provided on the sleeve 121 from the side of the outlet port 125. The diameter of the other land portion of the constricted part 127 is larger than that of the valve seat 127*a* so that when the constricted part 127 receives oil under pressure, the valve seat 127*a* abuts against the valve seat 121*a* and the poppet 123 is energized in a direction of closing the valve seat 127*a*, which zone corresponds to the upstream-closing pilot port 116** in FIG. 9.

Provided in a base end of the poppet 123 is a stationary throttle passage 128' through which the stationary throttle port 126 always communicates with a back pressure chamber 128 defined on the rear side of the base end of the poppet 123. Provided in a base end of the sleeve 121 is a slit 129 which is extended radially to throttlingly communicate, on its one side, with the port 126 as the poppet 123 is shifted in its opening direction and to communicate, on the other side, with a hole 130 made in the poppet 123 along its axial line, which zone corresponds to the variable throttle 119 in FIG. 9. The hole 130 is abuttingly closed at its open end by the check valve 120 energized by a spring force in its closing direction. The sleeve 121 is formed to have an opening 131 which communicates with the downstream line at its position opposed to the outlet side of the check valve 121. The spring for energizing the check valve 120 corresponds to the spring 115 shown in FIG. 9. The poppet 123 is fluidically coupled at its tip end face to the downstream line through the opening 131, which zone corresponds to the downstream-closing pilot port 117 shown in FIG. 9.

In the operation of the system of FIG. 10, when the pilot valve **113*a* is switched to supply oil under pressure to the opening pilot port 118, the oil is further sent through the stationary throttle passage 128' to the back pressure chamber 128 so that an opening pilot pressure acts on the base end of the poppet 123 and the poppet 123 is shifted by an amount corresponding to the pilot pressure and opened, whereby oil is supplied to the downstream line at a flow rate corresponding to the shift of the poppet 123. Under this condition, the slit 129** is opened in response to the shift of the poppet 123 to pass the pilot oil at the opening pilot port 118 from the slit 129 through the hole 130 and check valve 120 to the downstream line. As a result, the pressure of the opening pilot port 118 is kept at a constant level determined by the opening of the pilot valve 113*a* and the position of the poppet 123 is determined by the operating amount of the pilot valve 113*a*, that is, by the opening of the valve 113*a*, thus preventing the poppet 123 from being overrun. When a pressure on the downstream line becomes higher than a pressure on the upstream line, the poppet 123 is energized in a direction pushing the valve seat 127*a* to abut against the valve seat 121*a* to be closed.

Figure 11:
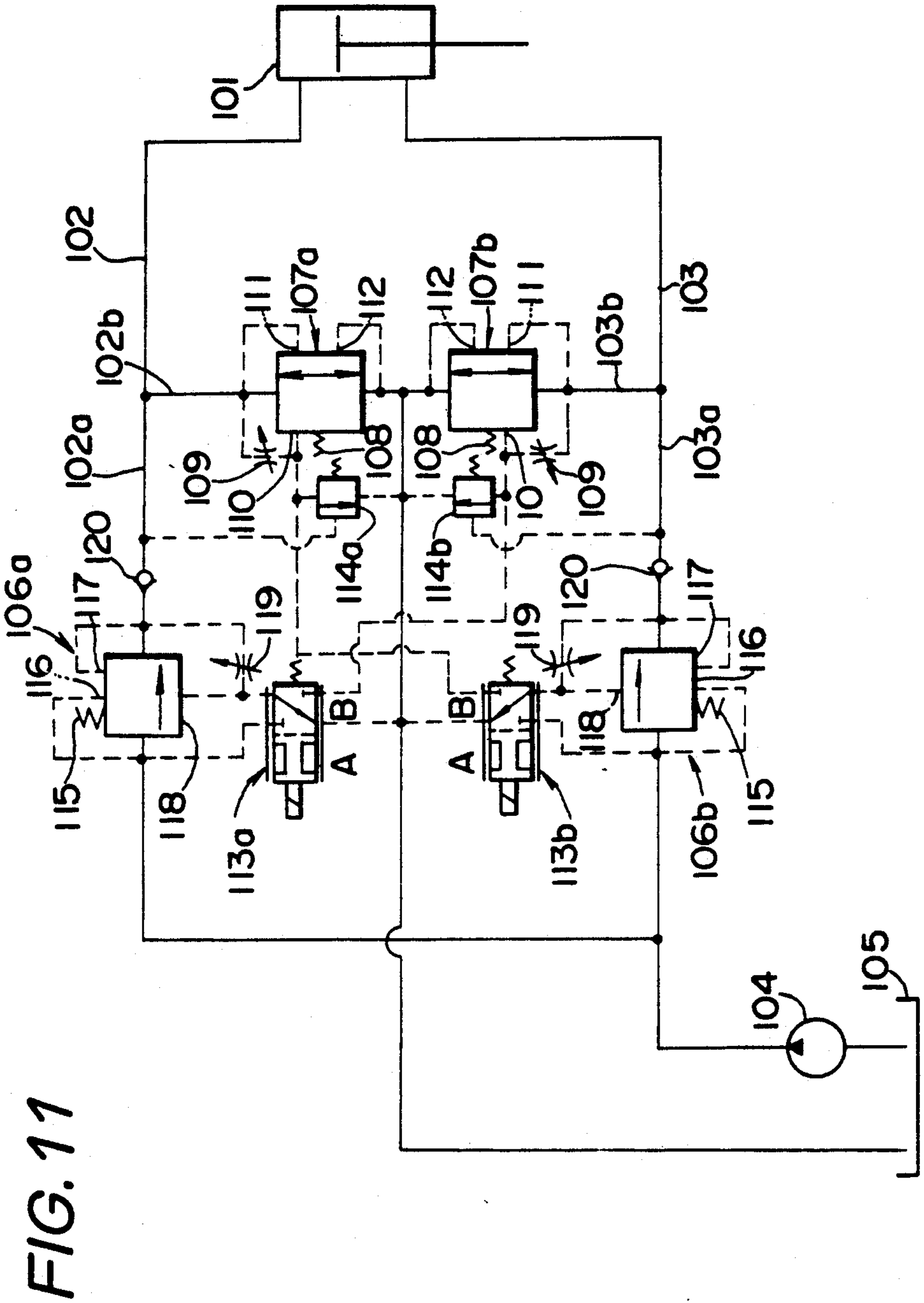
FIG. 11 shows an oil pressure control circuit which uses oil pressure control systems according to other embodiment of the present invention to drive an actuator built in a machine designed for construction work.
Figure 12:
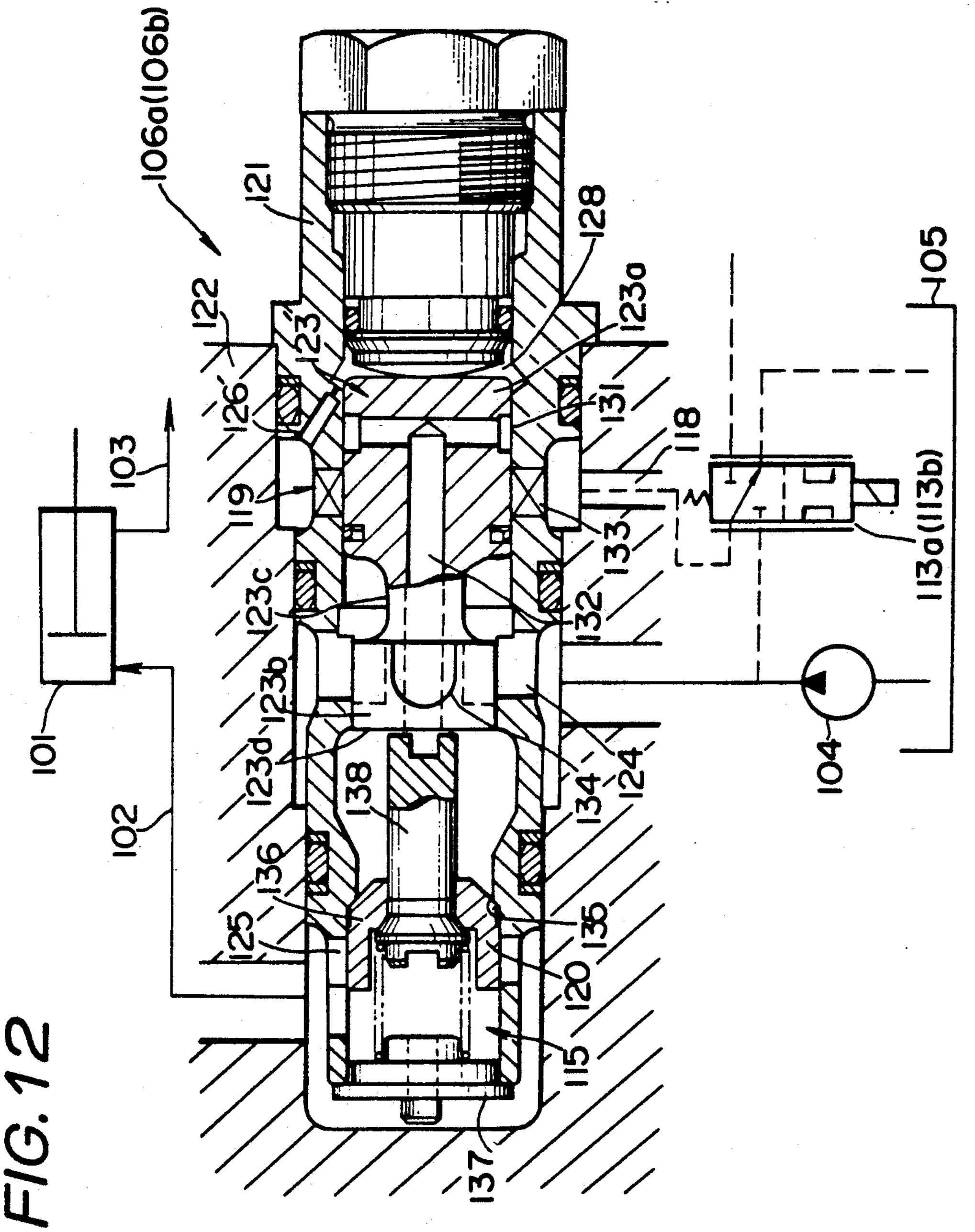
FIG. 12 shows a particular construction, in cross section, of one of flow control valves in one of the oil pressure control systems used in the oil pressure control circuit of FIG. 11.

Referring to FIGS. 11 and 12, there is shown an oil pressure control circuit which comprises oil pressure control systems according to another embodiment of the present invention to drive an actuator built-in a machine designed for construction work. In the present embodiment, substantially the same constituent members as those in the foregoing embodiment of FIGS. 9 and 10 are denoted by the same reference numerals for brevity of the explanation.

In the oil pressure control system of the foregoing embodiment of FIGS. 9 and 10, the opening pilot ports 118 of the flow control valves 106*a* and 106*b* are connected respectively through the variable throttle 119 and check valve 120 to the downstream line. In the oil pressure control system of the present embodiment, however, as shown in FIG. 11, flow control valves 106*a* and 106*b* are connected through associated variable throttles 119 to associated downstream lines in which check valves 120 are inserted.

With the foregoing arrangement, when pilot valves 113*a* and 113*b* are in their neutral position B, the flow control valves 106*a* and 106*b* on the both meter-in sides are drained at their opening pilot ports 118 and 118, in which case the flow control valves 106*a* and 106*b* receive a pump pressure at their upstream-opening pilot ports 116 and 116 and therefore the valves 106*a* and 106*b* are put in their closed state, with the result that an actuator 101 is not driven.

When one, for example, first one 113*a* of the both pilot valves 113*a* and 113*b* is switched to its communication position A, the first flow control valve 106*a* on the meter-in side is subjected at its opening pilot port 118 to a pressure to be opened so that oil under pressure is supplied from a hydraulic pump 104 to one port of the actuator 101 to drive the actuator in one direction. Under this condition, more specifically, a flow control valve 107*b* on the second meter-out side is drained at its closing pilot port 110 to the tank line through the first pilot valve 113*a*, so that the return oil from the actuator 101 is drained through the flow control valve 107*b* on the second meter-out side.

In the above operation, if the flow control valve 106*a* on the first meter-in side is opened excessively, then the associated variable throttle 119 is opened in response to this valve shift and a pilot pressure at the associated opening pilot port 118 of the valve 106*a* is reduced, thus correcting the excessive opening of the valve 106*a*. In this case, the flow rate of oil flowing through the flow control valve 106*a* is determined not by the pressure of oil discharged from the hydraulic pump 104 but by the pressure at the opening pilot port 118, that is, by the opening of the pilot valve 113*a*. When a pressure in the downstream line on the meter-in side is higher than a pressure in the pump line, the higher pressure is applied to a downstream-closing pilot port 117 of the flow control valve 106*a* to close the valve 106*a*.

On the other hand, when the other 113*b* of the both pilot valves 113*a* and 113*b* is switched, the flow control valves 106*a* and 107*a* on the second meter-in side and on the first meter-out side area actuated to drive the actuator 101 in the opposite direction. The operation of the both valves 106*a* and 107*a* is substantially the same as that in the foregoing embodiment.

A particular arrangement of the flow control valve 106*a* or 106*b* on the meter-in side is shown in FIG. 12 in which reference numeral 121 is a sleeve fitted into a casing 122 and the sleeve 121 itself receives a spool 123' slidably movable therein. The sleeve 121 is formed to have an inlet port 124 communicating with its upstream line, an outlet port 125 communicating with its downstream line, a stationary throttle port 126' through which the opening pilot port 118 communicated with a back pressure chamber 126 defined behind a face of a base end of the spool 123', and a slit 133.

The spool 123' of a stepped shape comprises a larger-diametered land part 123*a*, a smaller-diametered land part 123*b*, and a constricted part 123*c* provided between the smaller- and larger-diametered land parts 123*a* and 123*b*. The larger-diametered land part 123*a* is provided in its periphery with an annular groove 131 which is opened to an end face 123*d* of the smaller-diametered land part 123*b* through a communication hole or passage 132. The smaller-diametered land part 123*b* is provided in its periphery with a plurality of notched grooves 134 arranged in its peripheral direction.

The sleeve 121 is provided at its one end with a valve seat 135 against which a valve body 136 of the check valve 120 is pressed under the force of a spring 137. The valve body 136 is provided with a rod 138 an end face of which is closely opposed to the end face 123*d* of the smaller-diametered land part 123*b* of the spool 123'.

The slit 133, larger-diametered land part 123*a* and annular groove 131 form the variable throttle 119, while the inlet port 124 and notched groove 134 form a variable opening for flow control. The spring 137 for energizing the valve body 136 of the check valve 120 corresponds to the above-mentioned spring 115. The end face 123*d* of the smaller-diametered land part 123*b* of the spool 123' corresponds to the pilot port 117 for closing the downstream line. An area difference between the larger-and smaller-diametered land parts 123*a* and 123*b* of the spool 123' causes the inflow oil to shift the spool 123' in its closing direction. The part causing this area difference corresponds to the pilot port 116 for closing the upstream line.

Therefore, when the pilot valve 113*a* is switched to supply oil to the opening pilot port 118, the oil supplied to the pilot port 118 is supplied through the stationary throttle hole 126' to the back pressure chamber 126 so that a pilot pressure acts on the right end face of the spool 123', whereby the spool 123' is actuated to its opening direction (leftwardly in FIG. 12). During the movement of the spool 123', the slit 133 communicates with the annular groove 131 of the larger-diametered land part 123*a* and thus oil under pressure in the back pressure chamber 126 flows therefrom through the slit 133 and annular groove 131 to the communication hole 132. And the spool 123' is stopped at a position at which the pressure of the opening pilot port 118 reaches a level determined by the configuration (area ratio between pressure receiving faces) of the spool. That is, the opening of the spool 123' is controlled by the opening of the pilot valve 113*a* so that oil under pressure discharged from the pump 104 is supplied to the check valve 120 through the inlet port 124 and notched groove 134 to open the check valve 120 and then sent to the downstream line.

What is claimed is:

1. A hydraulic pressure control system comprising:
   a flow control valve having a moveable valve body, an input port, an output port, a pilot output port, and a back pressure chamber,
   and a first variable throttle provided in a first pilot hydraulic passage extending from the input port to the pilot output port for changing an opening area in response to the amount of movement of said valve body in a direction where said valve body leaves from a valve seat,
   a pilot valve having a second variable throttle,
   a pilot valve input passage connecting the pilot output port to the pilot valve,
   said pilot output port of said flow control valve being coupled through said pilot valve input passage and said pilot valve to said output port of said flow control valve, the pilot valve variably controlling the amount of hydraulic pressure in the back pressure chamber to thereby variably control the position of said valve body,
   wherein said flow control valve is provided with a fixed throttle disposed in a second pilot hydraulic passage extending from the back pressure chamber to one of the first pilot hydraulic passage and the pilot valve input passage.

2. A hydraulic pressure control system as set forth in claim 1, wherein said first variable throttle of said flow control valve is arranged to increase said opening area in response to the amount of movement in said valve body in the direction where the valve body leaves from a valve seat, and wherein said second pilot hydraulic passage extends from the back pressure chamber and is connected to the pilot valve input passage.

3. A hydraulic pressure control system as set forth in claim 1, wherein said first variable throttle of said flow control valve is arranged to reduce said opening area in response to the amount of movement in said valve body in the direction where said valve body leaves from the valve seat, and said second pilot hydraulic passage extends from the back pressure chamber and is connected to said first pilot hydraulic passage at a location upstream of the first variable throttle.

4. A hydraulic pressure control system as set forth in claim 1, wherein said second pilot hydraulic passage extends from the back pressure chamber to the first pilot hydraulic passage.

5. A hydraulic pressure control system as set forth in claim 1, wherein said second pilot hydraulic passage extends from the back pressure chamber to the pilot valve input passage.

6. A hydraulic pressure control system comprising: a flow control valve including:
   an input port;
   an output port;
   a pilot output port;
   a main hydraulic passage coupling the input port to the output port;
   a first pilot hydraulic passage coupling the input port to the pilot output port;
   a valve body moveable within the main hydraulic passage to control the size of the main hydraulic passage;
   a back pressure chamber adjacent the valve body; and
   a first variable throttle in the first pilot hydraulic passage having a passage opening whose area is changed in response to the movement of the valve body;
   a second pilot hydraulic passage coupling the pilot output port and the output port;
   a pilot valve in the second pilot hydraulic passage and having a second variable throttle;
   wherein the back pressure chamber is in flow communication with the pilot valve and the pressure in the back pressure chamber is variably controlled in response to variable operation of the pilot valve to variably control the position of the valve body and wherein there is a damper hydraulic passage having a fixed throttle therein between the back pressure chamber and at least one of the pilot hydraulic passages for controlling the rate at which hydraulic fluid can escape from the back pressure chamber.

7. In a hydraulic pressure control system of the type having a flow control valve in which flow of hydraulic fluid between an input port and an output port is controlled by a moveable valve body whose positon is controlled by the pressure of hydraulic fluid in a back pressure chamber and wherein the pressure of the fluid in the back pressure chamber is variably controlled by a pilot valve coupled via a pilot fluid path to the input port of the flow control valve to variably control the position of the flow control valve, the improvement wherein a fixed throttle is connected in an additional fluid path between the back pressure chamber and the pilot fluid path to control the rate at which hydraulic pressure in the back pressure chamber can be changed in response to variable operation of the pilot valve, thereby preventing overshoot in movement of the valve body as it moves between various positions.

* * * * *